United States Patent
Faruque et al.

(10) Patent No.: US 9,156,426 B1
(45) Date of Patent: Oct. 13, 2015

(54) HEADREST-MOUNTED VEHICLE AIRBAG

(71) Applicant: Ford Global Technologies, LLC, Dearborn, MI (US)

(72) Inventors: Mohammed Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 14/446,598

(22) Filed: Jul. 30, 2014

(51) Int. Cl.
*B60R 21/207* (2006.01)
*B60R 21/2165* (2011.01)
*B60R 21/00* (2006.01)
*B60R 21/231* (2011.01)

(52) U.S. Cl.
CPC ........... *B60R 21/207* (2013.01); *B60R 21/2165* (2013.01); *B60R 2021/0018* (2013.01); *B60R 2021/0048* (2013.01); *B60R 2021/2074* (2013.01); *B60R 2021/23192* (2013.01)

(58) Field of Classification Search
CPC ..................... B60N 2/4885; B60R 2021/2074; B60R 2021/23192; B60R 21/207; B60R 21/2165; B60R 2021/0018; B60R 2021/0048
USPC ................ 280/728.3, 730.1, 734, 735, 743.1; 297/216.12
See application file for complete search history.

(56) References Cited

U.S. PATENT DOCUMENTS

| | | | |
|---|---|---|---|
| 3,753,576 A | 8/1973 | Gorman | |
| 4,865,388 A * | 9/1989 | Nemoto | 297/403 |
| 5,738,407 A * | 4/1998 | Locke | 297/216.12 |
| 5,911,433 A | 6/1999 | Swann | |
| 6,095,550 A | 8/2000 | O'Loughlin et al. | |
| 6,199,900 B1 * | 3/2001 | Zeigler | 280/735 |
| 6,402,238 B1 * | 6/2002 | Bigi et al. | 297/216.12 |
| 6,424,055 B1 * | 7/2002 | Hambsch et al. | 307/10.1 |
| 6,474,733 B1 * | 11/2002 | Heilig et al. | 297/216.12 |
| 6,568,754 B1 * | 5/2003 | Norton et al. | 297/216.12 |
| 6,572,137 B2 | 6/2003 | Bossecker et al. | |
| 7,150,468 B2 | 12/2006 | Pan | |
| 7,318,601 B2 | 1/2008 | Sugimoto et al. | |
| 7,431,331 B2 | 10/2008 | Siemiantkowski | |
| 7,581,750 B2 | 9/2009 | Hirata et al. | |
| 8,336,909 B2 | 12/2012 | Lee | |

\* cited by examiner

*Primary Examiner* — Laura Freedman
(74) *Attorney, Agent, or Firm* — Frank MacKenzie; Bejin Bieneman PLC

(57) ABSTRACT

A head rest is mountable on a vehicle seat back with at least one hollow support bar. The support bar is adjustable to adjust the height of the head rest relative to the seat back. An airbag is located in the head rest and a connection is provided in the hollow head rest support bar between the airbag and an airbag system component in the seatback.

15 Claims, 5 Drawing Sheets

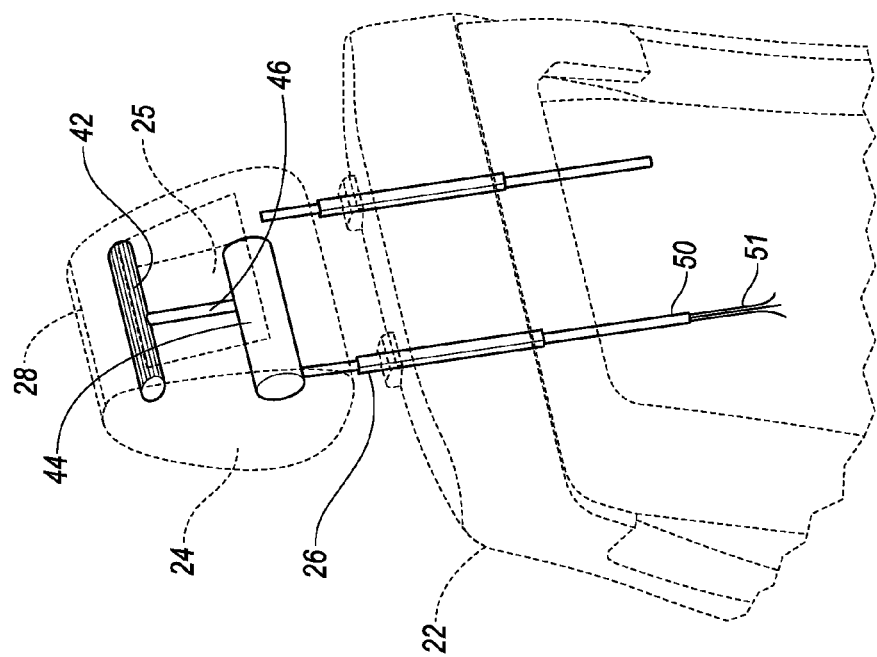
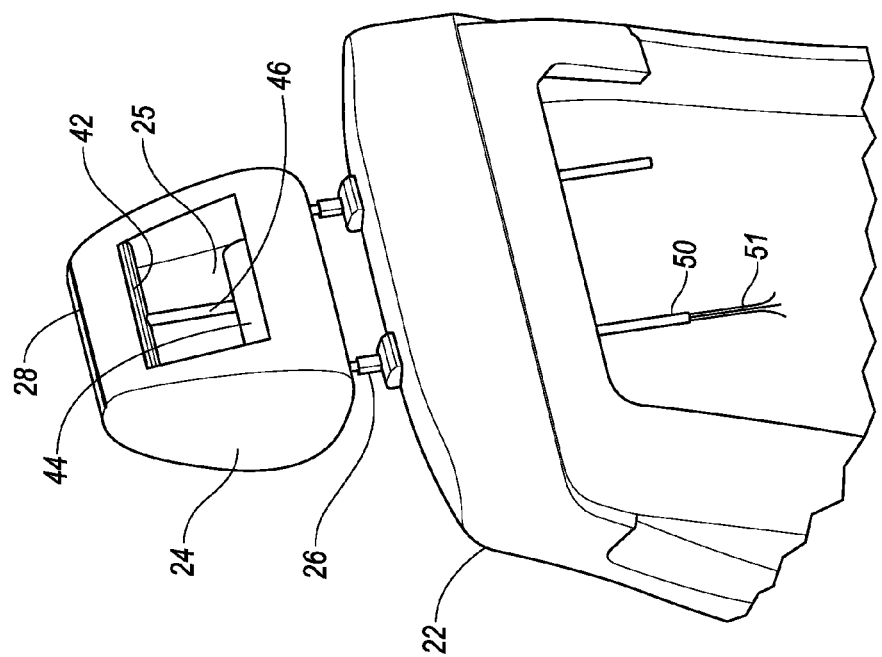
FIG. 3A
FIG. 3B

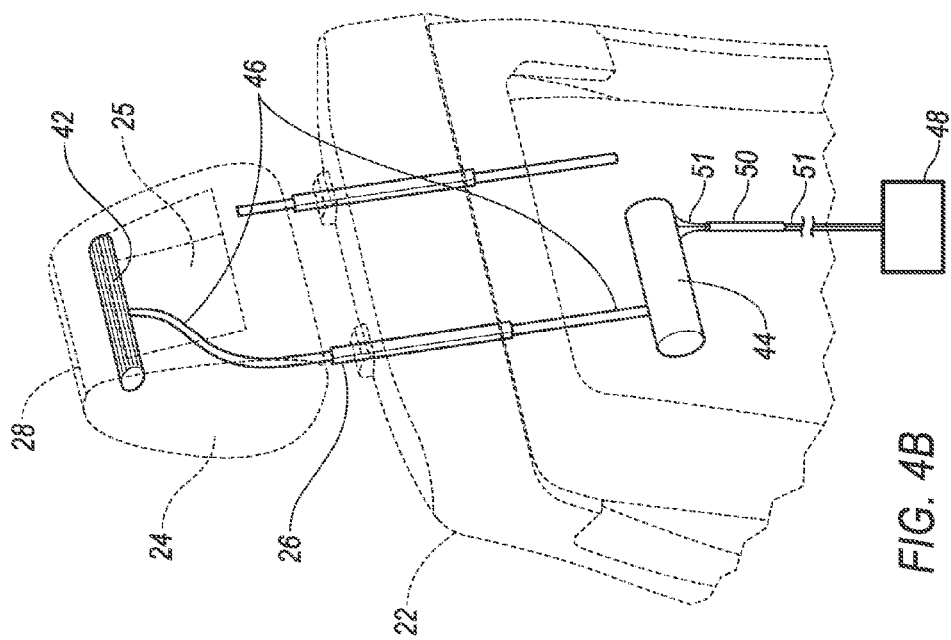
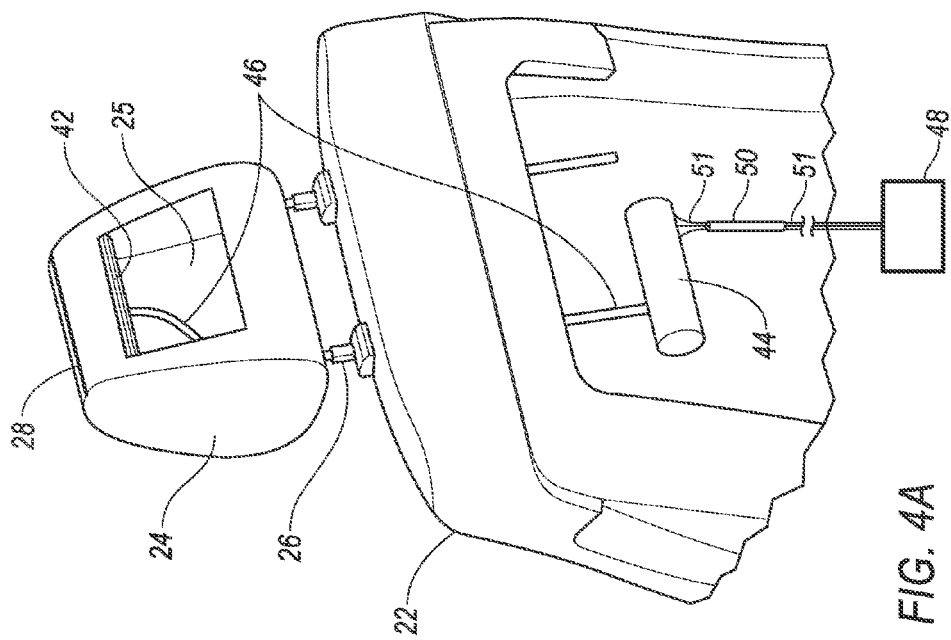

HEADREST-MOUNTED VEHICLE AIRBAG

BACKGROUND

A potential cause of head injuries in vehicle rollover accidents occurs when a vehicle roof impacts the ground. The impact may cause the roof to deform and to impact an occupant's head. A headliner may not provide enough cushioning to mitigate head trauma and injuries in such a rollover accident. Deploying an airbag above the head of a vehicle occupant could mitigate this potential head trauma. However, existing mechanisms for over-the-head airbags suffer from various deficiencies. For example, an airbag deployed from a vehicle seat back may undesirably force the occupant's head forward, and/or cause neck discomfort. Further, mechanisms to deploy over-the-head airbags from seat headrests require costly and aesthetically displeasing components to activate the airbag. Accordingly, there is a need for an improved over-the-head (or roof) airbag system.

DRAWINGS

FIG. 3A is a back perspective view of a portion of a seat back and headrest, showing the disposition of electrical wiring for the roof airbag.

FIG. 3B is a cross-sectional view of FIG. 3A, showing headrest support bars, and the electrical wiring running through support bars.

FIG. 4A is a back perspective view of a portion of a seat back and headrest, showing the disposition of a fill tube for the roof airbag.

FIG. 4B is a cross-sectional view of FIG. 4A, showing headrest support bars, and the fill tube running through support bars.

DETAILED DESCRIPTION

As disclosed herein, a headrest may be mounted on a vehicle seat back with hollow headrest support bars. An airbag, e.g., an airbag that deploys between an occupant's head and a vehicle roof, may be stored in the headrest. Connections such as electrical cables or fill tubes for the airbag may be provided through the hollow support bars, advantageously providing a connection between airbag system components in the seat back and airbag system components in the headrest. Further advantageously, such connection may be established without introducing additional components or impacting the aesthetics of the vehicle seat.

Figure 1:
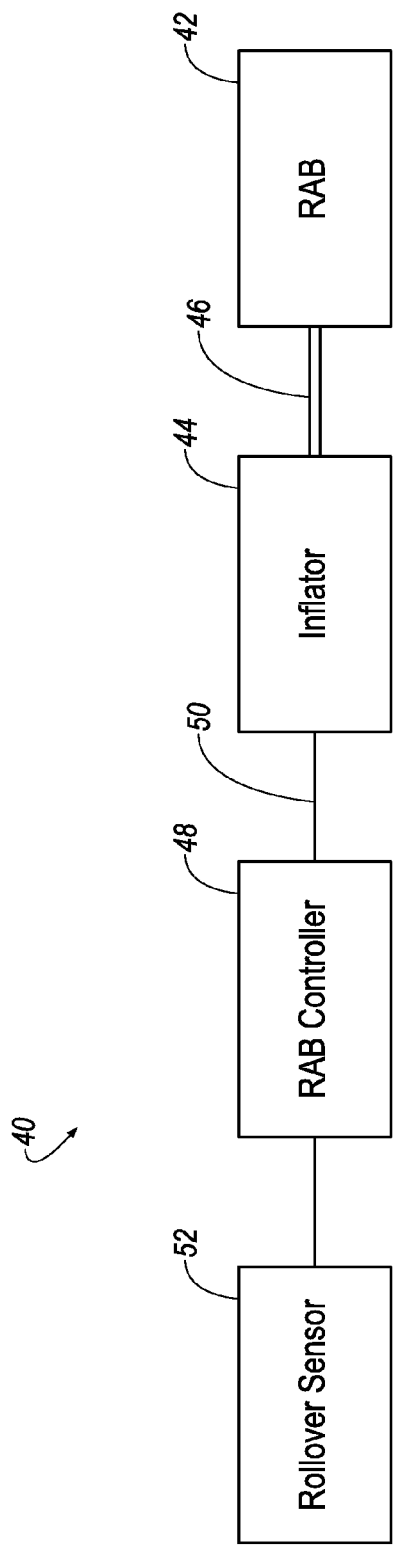
FIG. 1 is a block diagram of a roof airbag system.

FIG. 1 shows a block diagram of an airbag system 40, e.g., for a roof airbag. A roof airbag controller 48 is programmed to receive input from one or more rollover sensors 52. For example, rollover sensors 52 may include accelerometers or the like, such as are known. The RAB controller 48 is further programmed to detect a vehicle rollover event in a known manner, e.g., based partially on the input from sensors 52. Upon detecting a rollover event, the RAB controller 48 is yet further programmed to provide a signal to an inflator 44 to deploy a roof airbag (RAB) 42, whereupon the inflator 44 provides gas to the RAB 42 via a fill tube 46. The RAB controller 48 may be connected to, and receive inputs from, other vehicle 20 components. The RAB controller 48 is typically a microcontroller, and may be any type of computing device such as a computer or programmable logic array.

Turning now to FIGS. 2, 3A, 3B, 4A and 4B, a seat 20 in a vehicle 10 includes a seat back 22 having a headrest 24 mounted thereon by one or more headrest support bars 26, e.g., two bars 26 as shown in the figures. The headrest support bars 26 are adjustable in a known manner, e.g., using ratchets or the like, for adjusting the height of the headrest 24 relative to the seat back 22. A tear seam 28 is located at the top of the headrest 24. The tear seam 28 opens to allow RAB 42 to deploy from the headrest 24.

Figure 2:
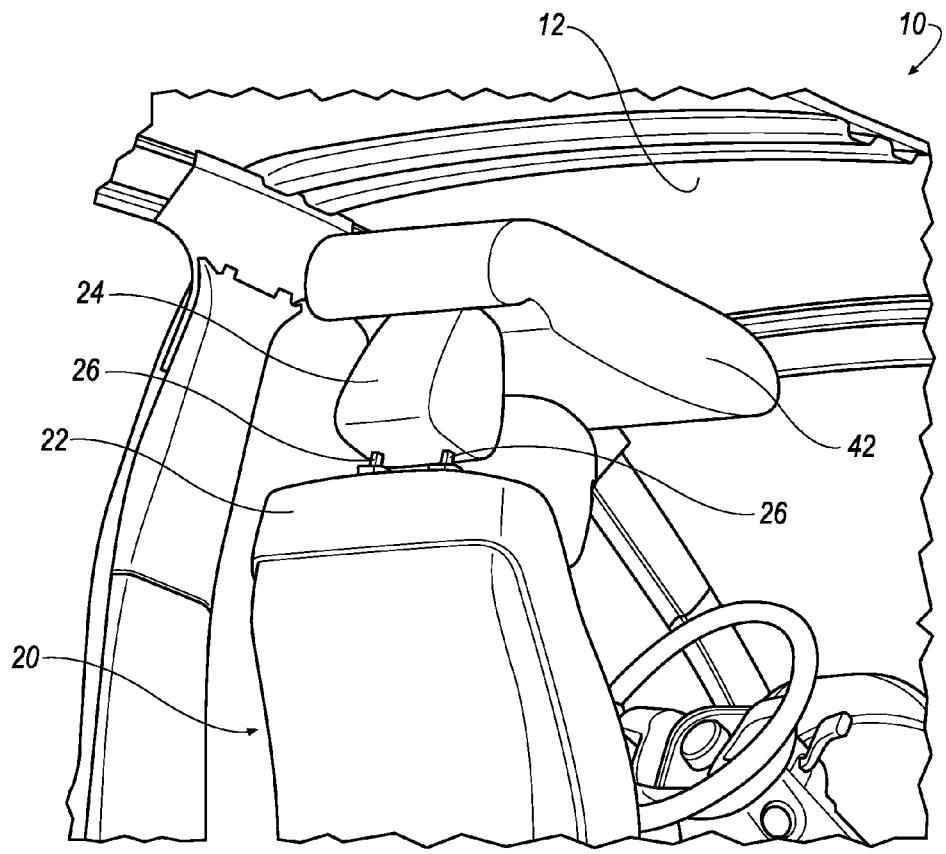
FIG. 2 is a perspective view of a vehicle portion showing a deployed roof airbag.

As seen in FIG. 2, the roof airbag (RAB) 42 in a deployed state protects an occupant's head from deformations of and/or impacts with a vehicle 10 roof 12 and a seat 20. For example, after a rollover event, e.g., when the vehicle 10 is upside-down, the vehicle 10 roof 12 may deform and cause trauma to the head of an occupant. Deploying an RAB 42 between the occupant's head and the roof 12 of the vehicle 10 generally mitigates trauma to the occupant's head caused by the deformation of the roof 12.

As seen in FIGS. 3A, 3B, each of the roof airbag 42 and the airbag inflator 44 can be located within the headrest 24. An electrical cable 50 including electrical wires 51 for electrically communicating with the inflator 44 originate with the RAB controller 48 (not shown in FIGS. 3A, 3B), and run from the seat back 22 to the headrest 24 through hollow head rest support bars 26. Further, the headrest 24 includes an inner cavity 25. The RAB 42 is typically located at or near a top side of the inner cavity 25. Additionally in the example of FIGS. 3A, 3B, an airbag inflator 44 is disposed near the bottom on the inner cavity of the headrest 24. A fill tube 46 connects the inflator 44 with the RAB 42. The fill tube 46 communicatively couples the inflator 44 and RAB 42 to provide a passage for gas from the airbag inflator 44 to flow into and inflate the RAB 42. A tear seam 28 is generally included at the top side of the inner cavity 25, through which the RAB 42 may be deployed. For example, the tear seam may be stitched or glued such that at a predetermined pressure exerted when the inflator 44 provides gas to inflate the RAB 42, the tear seam 28 opens to allow deploy the RAB 42.

In FIG. 3B, a cross-sectional view of the perspective view of the seat 20 and headrest 24 provided in FIG. 3A, a portion of the back side of the seat 20 has been removed to show the head rest support bars 26 passing through the top of the seat back 22. As can be seen in FIG. 3B, the electrical cable 50 is routed from the inflator 44, through the headrest support bars 26, to the seat back 22. The electrical wires 51 extend through the electrical cable 50 to the RAB controller 48, which is not shown; it will be understood that the electrical wires 51 extend further through the vehicle 10 to a location of the RAB controller 48.

Another example is shown in FIGS. 4A, 4B. As in the example discussed above, the RAB 42 is seen in FIGS. 4A and 4B to be located in the headrest 24. Further, the airbag inflator 44 is located in the seat back 22 of the vehicle seat 20. One or more fill tubes 46 for communicating gas from the airbag inflator 44 to the RAB 42 are run from the seat back 22 to the headrest 24 through hollow head rest support bars 26.

As seen in FIG. 4A an electrical cable 50 including electrical wires 51 runs through the seat back 22 continuing through the vehicle 10 to a location of the RAB controller 48.

As further shown in FIG. 4A, RAB 42 is located near a top side of the inner cavity 25. A fill tube 46 extends downward from the RAB 42, e.g., toward a side of the headrest 24, and then through a headrest support bar 26 to the seat back 22. The fill tube 46 continues through the inner cavity of the seat back and connects to the airbag inflator 44.

FIG. 4B is a cross-sectional view of the seat 20 and headrest 24, showing the headrest support bars 26 passing through the top of the seat back 22. As can be seen in FIG. 4B, the fill tubes 46 are routed from the airbag inflator 44 through the seat back 22, through the headrest support bars 26, to the RAB 42.

As noted above, FIG. 2 illustrates the RAB 42 in a deployed state. Typically, upon deployment, as mentioned above, inflation of the RAB 42 forces open the tear seam 28 and the RAB 42 expands through the opening created in the tear seam 28. As shown in FIG. 1, the RAB 42 extends forward, rearward, and to the left and right of the headrest 24 to form a protective barrier between the head of an occupant and the roof 12 of the vehicle 10.

Figure 5:
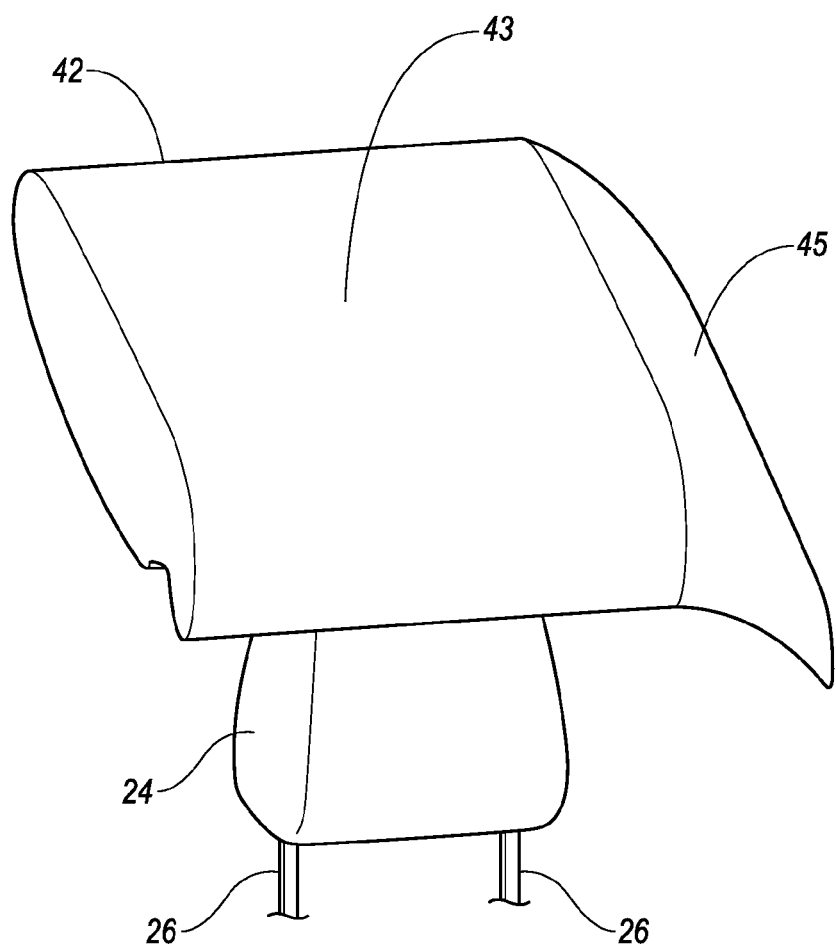
FIG. 5 is a perspective view of a variation of a roof airbag including a main portion and a side portion.

The RAB 42 may be provided in various shapes when deployed, one such shape being shown in FIG. 2. FIG. 5 shows another possible variation on the shape of RAB 42. In FIG. 5, the RAB 42 includes a main portion 43 and a side portion 45. The main portion 43 has a shape similar to the RAB 42 shown in FIG. 2, and extends forward, rearward and to the left and right of the headrest 24. The RAB 42 shown in FIG. 5, however, includes an additional portion 45 which extends to the right side and downward from the main portion 43. Other variations of a shape of the RAB 42, e.g., a side portion extending on from the left side, or a front or back portion extending down from the front or back of the main portion of the RAB 42 could also be used.

As used herein, the adverb "substantially" modifying an adjective means that a shape or structure may deviate from an exact described geometry because of imperfections in materials, machining, manufacturing, etc. Further, the term "exemplary" is used in the sense of signifying an example, e.g., a reference to an "exemplary widget" should be read as simply referring to an example of a widget.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An apparatus, comprising:
   a head rest mountable on a seat back with a plurality of support bars, the head rest including a tearable seam at a top end, at least one of the support bars being hollow, the support bars being adjustable to adjust the height of the head rest relative to the seat back;
   an airbag disposed in the headrest; and
   a connection disposed in the hollow headrest support bar between the airbag and one of an airbag inflator and an air bag controller, wherein the airbag in a deployed state extends through the tearable seam and covers the top end of the head rest.

2. The apparatus according to claim 1, wherein the connection includes at least one electrical wire.

3. The apparatus according to claim 1, wherein the connection includes at least one fill tube.

4. The apparatus according to claim 1, wherein the airbag controller is programmed to send a signal to the airbag upon detection of a rollover event.

5. The apparatus according to claim 4, further comprising a rollover sensor, wherein the airbag controller detects a rollover event at least partially based on an output signal from the rollover sensor.

6. The apparatus according to claim 1, wherein the airbag inflator is located in the seat back and the connection includes at least one fill tube.

7. The apparatus according to claim 1, wherein the airbag inflator is located in the headrest and the connection is at least one wire.

8. The apparatus according to claim 1, wherein the airbag comprises a main portion and at least one side extension portion, wherein, when the airbag is in a deployed state, the main portion extends upward from the headrest and further extends in a forward direction substantially parallel to a vehicle roof, and the side portion extends downward from a side of the main portion.

9. The apparatus of claim 1, wherein the support bars extend along a first axis, and the airbag in the deployed state is elongated along a second axis transverse to the first axis.

10. A roof airbag system, comprising:
    a roof airbag disposed in a vehicle seat head rest that is mountable on a seat back with a plurality of support bars, the head rest including a tearable seam at a top end, at least one of the support bars being hollow, the support bars being adjustable to adjust the height of the head rest relative to the seat back; and
    an airbag system component located in the seat back; wherein:
    the roof airbag is coupled to the component via a connection in the at least one hollow support bar and the airbag in a deployed state extends through the tearable seam and covers the top end of the head rest.

11. The roof airbag system according to claim 10, wherein the component is an airbag inflator and the connection includes at least one fill tube connecting the roof airbag and the airbag inflator.

12. The roof airbag system according to claim 10, wherein:
    the roof airbag system further includes an airbag controller;
    the roof airbag disposed in the head rest further includes an airbag inflator; and
    the connection includes at least one wire connecting the airbag controller and the airbag inflator.

13. The roof airbag system according to claim 10, wherein the seam is tearable upon deployment of the roof airbag.

14. The roof airbag system according to claim 10, wherein the roof airbag comprises a main portion and a side extension portion, wherein, when the roof airbag is in a deployed state, the main portion extends upward from the head rest and further extends in a forward direction substantially parallel to a vehicle roof, and the side portion extends downward from a side of the main portion.

15. The roof airbag system of claim 10, wherein the support bars extend along a first axis, and the roof airbag in the deployed state is elongated along a second axis transverse to the first axis.

* * * * *